J. F. WHITE & J. V. BOWHANNAN.
Plaiting Attachment for Sewing-Machines.

No. 212,417.  Patented Feb. 18, 1879.

UNITED STATES PATENT OFFICE.

JOHN F. WHITE AND J. VALENTINE BOWHANNAN, OF GALLATIN, TENNESSEE; SAID WHITE ASSIGNOR TO SAID BOWHANNAN.

IMPROVEMENT IN PLAITING ATTACHMENTS FOR SEWING-MACHINES.

Specification forming part of Letters Patent No. 212,417, dated February 18, 1879; application filed September 21, 1878.

*To all whom it may concern:*

Be it known that we, JOHN F. WHITE and J. VALENTINE BOWHANNAN, of Gallatin, in the county of Sumner and State of Tennessee, have invented certain Improvements in Plaiting Attachments for Sewing-Machines, of which the following is a specification:

This invention relates to plaiting attachments for sewing-machines; and it consists in a peculiar combination and arrangement of parts, hereinafter described.

Figure 1:
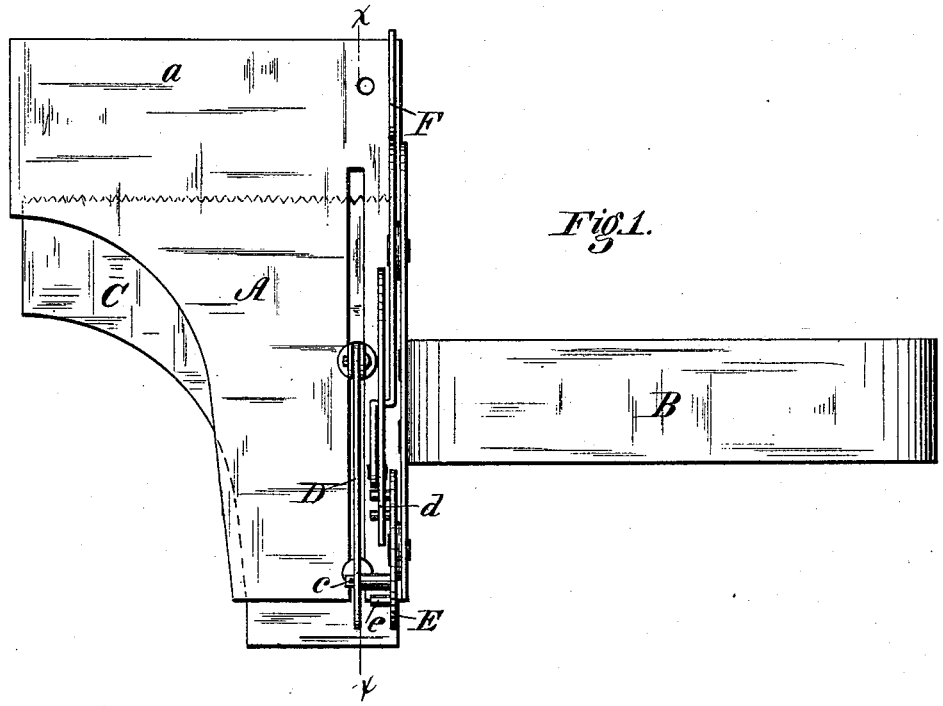
Figure 2:
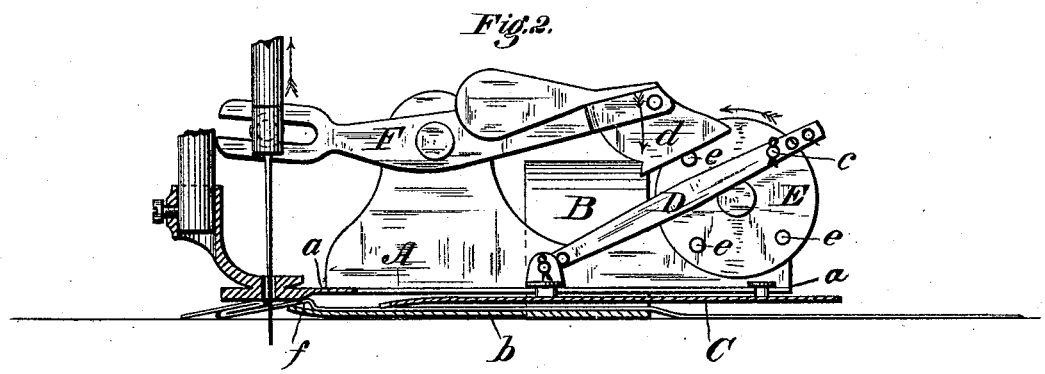

Figure 1 represents a top-plan view of the improved device, and Fig. 2 a longitudinal section of the same on the line $x\ x$ of Fig. 1.

The device consists, essentially, of a body, A, composed of an upper plate, $a$, and a lower plate, $b$, attached, respectively, to the upper and lower arms of a spring-loop, B, a reciprocating toothed slide or knife, C, connected by a pitman, D, with the arm $c$ of a crank-wheel, E, and a vibrating lever, F, pivoted at or near its middle to the body A, connected at one end with the needle-bar, and furnished at its opposite end with a pivoted dog arranged to act upon pins $e$ on the crank-wheel, and thereby impart a rotary motion to the same.

In order to permit the ready connection of the lever F with the needle-bar, the end of said lever is slotted, as represented in Fig. 2, said slot receiving the needle-screw, whereby the movement of the needle-bar is caused to vibrate said lever. The dog $d$, with which the lever is furnished, is provided with an extension in rear of its pivot, which, acting as a weight, serves to keep the nose or point of said dog in an elevated position, and extending outward from the end of the lever, as shown, though a spring may be used for this purpose, if preferred. In this position the dog engages with one of the pins $e$ of the crank-wheel E, and, as the dog is caused to descend by the upward movement of the needle-bar and the consequent vibration of the lever F, it carries said pin downward before it, causing a partial revolution of the crank-wheel.

In the drawings, the crank-wheel E is represented as furnished with four pins, the crank-arm $c$ serving both the purpose of a pin and crank-arm. Each downward movement of the dog $d$ causes a quarter-revolution of the crank-wheel E; hence it will be seen that four strokes of the needle-bar and a corresponding number of vibrations of the lever F in each direction are required to produce a complete revolution of the crank-wheel and a consequent movement forward and back of the plaiting slide or knife C, thus permitting four stitches to be made in each fold or plait. By changing the throw of the lever and the number of pins in the crank-wheel, the number of strokes required to rotate the crank-wheel and the number of stitches taken may be increased or diminished, as found desirable.

In order that the dog $d$ may pass above the pin which it is next to engage with, and not cause the backward rotation of the crank-wheel, the dog is pivoted in the end of the lever F in such manner that it may readily yield as its upper face comes in contact with the under side of the pin, its weighted rear end throwing its forward end out over the pin as soon as its nose or point passes the same, the rear end of the dog locking against the lever F and preventing the dog from yielding as it bears down upon the pin.

Upon the under side of the upper plate, $a$, of the body is formed a shoulder, $f$, which serves to hold the cloth or goods, while the slide or knife C advances to form the fold, and the distance that the knife or slide C passes beyond this shoulder regulates the distance that the folds overlap each other, and consequently the width of the fold on the face of the finished goods. In order that this movement of the slide past the shoulder $f$ may be varied, the pitman D, by which the slide is moved, is furnished with a series of holes, through any of which the crank-pin $c$ may be passed, thus giving greater or less length of pitman, and consequently causing the knife or slide C to move a greater or less distance beyond the point or shoulder $f$.

The spring-loop B serves to keep the upper and lower plates, $a\ b$, in proper relative position, and also permits the goods to be passed between the plates into its open portion, whereby the plaits or folds may be formed as far from the edge of the goods as desired, and the stitching correspondingly located.

Having thus described our invention, what we claim is—

1. In a plaiter, the combination of the reciprocating slide or knife, the wheel E, connecting-pitman D, and the lever F, pivoted at its middle, provided with the dog $d$, and adapted for connection at its extremity to the needle-bar of the sewing-machine, as shown.

2. The plaiter consisting of a presser-plate, $a$, a base-plate, $b$, a spring arm or loop, B, connecting said parts, a reciprocating slide or knife mounted on plate $a$, and the operating devices consisting of the pitman D, wheel E, and lever F, also mounted on said plate.

JOHN F. WHITE.
J. VALENTINE BOWHANNAN.

Witnesses:
J. F. WHITE,
DANL. T. McKAIN.